US 9,764,772 B2

(12) United States Patent
Kondo et al.

(10) Patent No.: US 9,764,772 B2
(45) Date of Patent: Sep. 19, 2017

(54) VEHICLE FRONT BODY STRUCTURE

(71) Applicant: HONDA MOTOR CO., LTD., Tokyo (JP)

(72) Inventors: Takehiro Kondo, Wako (JP); Tomohito Kamada, Wako (JP); Kiyohiko Matsuoka, Wako (JP); Akira Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/042,472

(22) Filed: Feb. 12, 2016

(65) Prior Publication Data

US 2016/0244097 A1     Aug. 25, 2016

(30) Foreign Application Priority Data

Feb. 19, 2015   (JP) ................................ 2015-030461

(51) Int. Cl.
*B60K 37/00* (2006.01)
*B62D 25/08* (2006.01)

(52) U.S. Cl.
CPC ................................ *B62D 25/082* (2013.01)

(58) Field of Classification Search
CPC ...... B62M 27/02; E06B 9/115; G03B 21/602; G09F 1/10; A01D 51/00; B29C 66/71; H01R 13/512; A43B 7/28; A63F 13/06; A63F 13/24; B62D 25/082
USPC .................................................. 296/203.02
See application file for complete search history.

(56) References Cited

U.S. PATENT DOCUMENTS

| | | | | |
|---|---|---|---|---|
| 6,152,521 A | * | 11/2000 | Hayashi | B62D 21/152 296/187.09 |
| 7,631,924 B2 | * | 12/2009 | Nilsson | B60R 19/34 296/133 |
| 8,727,428 B2 | | 5/2014 | Takeuchi et al. | |
| 9,446,725 B2 | * | 9/2016 | Yamada | B62D 21/152 |
| 2003/0094803 A1 | * | 5/2003 | Fujiki | B62D 21/155 280/784 |
| 2004/0090085 A1 | * | 5/2004 | Kawasaki | B60K 1/04 296/187.09 |
| 2004/0195862 A1 | * | 10/2004 | Saeki | B62D 21/152 296/187.09 |
| 2005/0145305 A1 | * | 7/2005 | Bjorneklett | B60R 19/03 148/508 |
| 2006/0170206 A1 | * | 8/2006 | Mitsui | B60T 17/046 280/797 |

(Continued)

FOREIGN PATENT DOCUMENTS

JP     5640934 B2     12/2014

*Primary Examiner* — Kiran B Patel
(74) *Attorney, Agent, or Firm* — Westerman, Hattori, Daniels & Adrian, LLP (57) ABSTRACT

A pair of left and right upper members are provided to extend substantially along a vehicle longitudinal direction on both sides of the left and right front side frames in a vehicle width direction and to have their rear ends joined to front pillars disposed at lateral ends of a cabin. Each of the upper members has a substantially rectangular shape in cross section constituted by left and right walls and upper and lower walls. A weak portion, such as a recess, is provided in at least one corner portion having no flange among corner portions formed between adjacent walls of the upper members.

11 Claims, 9 Drawing Sheets

(56) References Cited

U.S. PATENT DOCUMENTS

| | | | |
|---|---|---|---|
| 2011/0291431 A1* | 12/2011 | Buschsieweke | B60R 19/34 293/133 |
| 2013/0207417 A1* | 8/2013 | Kihara | B60R 19/34 296/187.09 |
| 2014/0062107 A1* | 3/2014 | Kim | B60R 19/34 293/133 |
| 2014/0292028 A1* | 10/2014 | Dix | B62D 25/088 296/187.1 |
| 2014/0312654 A1* | 10/2014 | Komiya | B62D 21/11 296/187.09 |
| 2015/0232050 A1* | 8/2015 | Yamada | B60R 19/34 296/187.1 |
| 2016/0185392 A1* | 6/2016 | Higuchi | B62D 25/085 180/312 |
| 2016/0236718 A1* | 8/2016 | Tatsuwaki | B62D 21/155 |

* cited by examiner

VEHICLE FRONT BODY STRUCTURE

CROSS REFERENCES TO RELATED APPLICATIONS

The present application claims priority under 35 U.S.C. §119 to Japanese Patent Application No. 2015-030461, filed Feb. 19, 2015, entitled "VEHICLE FRONT BODY STRUCTURE." The contents of this application are incorporated herein by reference in their entirety.

TECHNICAL FIELD

The present disclosure relates to a front body structure of a vehicle.

BACKGROUND

In a front body of a vehicle, a pair of left and right front side frames extend forward from a front lower portion of a cabin and constitute a main portion of a lower flame. A known front body structure of a vehicle body includes a pair of upper members extending substantially along a vehicle longitudinal direction (front-rear direction of the vehicle body) and disposed outside left and right front side frames in a vehicle width direction. Rear ends of the left and right upper members are joined to front pillars disposed at lateral ends of a front portion of a cabin so that an impact load applied from the front is transmitted to a peripheral portion of the front pillars (see, for example, Japanese Patent No. 5640934).

SUMMARY

In the related art front body structure of a vehicle, the upper members extend substantially along the vehicle longitudinal direction and are disposed outside the left and right front side frames in the vehicle width direction. Thus, an impact load applied from the front of the vehicle can be distributed to the front side frames and the upper members and received thereby. This structure, therefore, can reduce the size and weight of the left and right front side frames.

In the front vehicle body structure including the upper members described above, when an impact load is applied from the front of the vehicle, it is desired for upper members to stably absorb energy of the load. That is, since the rear ends of the upper members are joined to the front pillars at lateral ends of the cabin, if the upper members cannot sufficiently absorb the energy, a peripheral portion of the front pillars inevitably needs to be enlarged in order to maintain rigidity around the front pillars. For this reason, it is desired for the upper members to stably absorb energy of an impact load applied from the front of the vehicle.

one embodiment of the present application provides a vehicle front body structure in which upper members can stably absorb an impact load applied from the front of the vehicle.

A vehicle front body structure according to one embodiment of the present disclosure includes: a pair of left and right front side frames (e.g., front side frames 4 of an embodiment) extending forward from a front lower portion of a cabin; and a pair of left and right upper members (e.g., upper members 9 of the embodiment) extending substantially along a vehicle longitudinal direction, disposed outside lateral ends of the left and right the front side frames in a vehicle width direction, and having rear ends joined to front pillars (e.g., front pillars 5 of the embodiment) disposed at lateral ends of the front portion of the cabin, wherein each of the upper members has a substantially rectangular shape in cross section constituted by left and right side walls and upper and lower walls, and a weak portion (e.g., a recess 20F or 20R of the embodiment) is provided in at least one corner portion (e.g., a corner portion 15c-3 or 16i-3 of the embodiment) having no flange among corner portions provided between adjacent walls of the upper members.

In this configuration, when an impact load is applied from the front of the upper members, the upper members are stably deformed from the weak portion so that the impact load can be stably absorbed by the upper members during the deformation.

Preferably, each of the upper members includes at least one curved region (e.g., a curved region A1 or A2 of the embodiment) that is curved upward or downward, and the weak portion is disposed in a corner portion of the curved region located between the upper or lower wall having a concave outer surface and one of the side walls adjacent to the upper or lower wall. In this case, since the weak portion is provided in the corner portion in contact with a wall having an outer concave surface among curved regions of the upper members in which the transmission direction of an impact load changes, upon application of the impact load, the load is concentrated on the weak portion so that the upper members can be more stably deformed.

Each of the upper members may include a front curved region (e.g., the curved region A1 of the embodiment) that is curved upward toward a rear of the vehicle and a rear curved region (e.g., the curved region A2 of the embodiment) that is curved downward toward a front of the vehicle, in the front curved region, the weak portion may be disposed in a corner portion between the upper wall and one of the side walls adjacent to the upper wall, and in the rear curved region, the weak portion may be disposed in a corner portion between the lower wall and one of the side walls adjacent to the lower wall. In this case, upon application of an impact load, the front curved region and the rear curved region are deformed with bending in such a manner that intermediate regions thereof rotate in one direction. Accordingly, energy absorption by deformation with bending of the upper members can be more stably obtained.

At least one of the upper wall or the lower wall of each of the upper members may be provided with a ridge (e.g., a ridge 25 or 26 of the embodiment) extending substantially along a direction in which the upper member extends. In this case, elastic deformation of a wall is suppressed by the ridge extending along the extension direction of the upper member. Thus, an increased amount of energy can be absorbed at or after a start of deformation with bending of the upper member. In addition, the ridge can be used for relatively easily adjusting the deformation location and direction of the upper members.

The ridge preferably extends to a location near the weak portion so as not to overlap a region where the weak portion is provided. In this case, upon application of an impact load, the load can be concentrated near the weak portion. Thus, deformation with bending of the upper members in the weak portion can be more stably obtained.

At least one of the side walls of at least one of the left upper member or the right upper member may be provided with a stiffening bead (e.g., a stiffening bead 28 of the embodiment) extending substantially along a direction in which the upper member extends. In this case, elastic deformation of a side wall can be suppressed by the stiffening bead extending along the extension direction of the upper members. Thus, an increased amount of energy can be absorbed at or after a start of deformation with bending of the upper members. In addition, the lateral deformation is suppressed by the stiffening bead, and thus, the upper members can be more stably deformed by bending in the vertical direction. In the above explanation of the exemplary embodiment, specific elements with their reference numerals are indicated by using brackets. These specific elements are presented as mere examples in order to facilitate understanding, and thus, should not be interpreted as any limitation to the accompanying claims.

In one embodiment, the weak portion is provided at least one corner portion having no flange among corner portions formed between adjacent walls of the upper members. Thus, when an impact load is applied from the front of the vehicle, stable deformation with bending of the upper members from the weak portion can be induced so that the impact load can be stably absorbed in the upper members. In particular, the weak portion is provided in a corner portion that is not easily elastically deformed in a plane direction. Thus, upon application of an impact load, the upper members can be more stably deformed with bending.

BRIEF DESCRIPTION OF THE DRAWINGS

The advantages of the disclosure will become apparent in the following description taken in conjunction with the following drawings.

DETAILED DESCRIPTION

Figure 1:
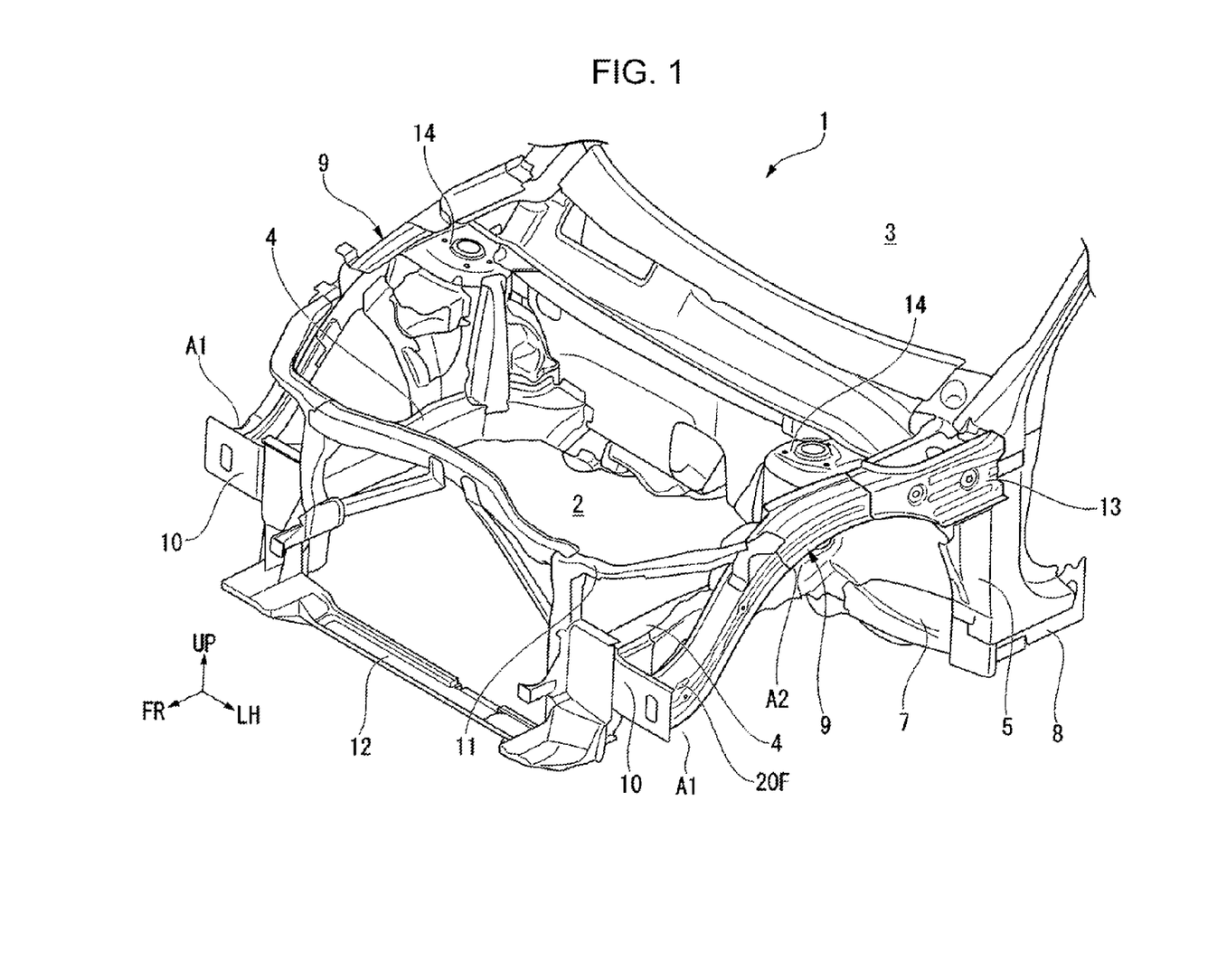
FIG. 1 is a perspective view illustrating a front frame portion of a vehicle according to an embodiment of the present disclosure.

An embodiment of the present application will be described with reference to the drawings. In the drawing, an arrow FR indicates a forward direction of a vehicle, an arrow UP indicates an upward direction of the vehicle, and an arrow LH indicates a left-hand direction of the vehicle. FIG. 1 illustrates a front frame portion of a vehicle 1 according to the embodiment. In FIG. 1, reference numeral 2 denotes an engine compartment disposed forward of a cabin 3. Front side frames 4 extending in a vehicle longitudinal direction are disposed on both sides (i.e., in a vehicle width direction) of the engine compartment 2. Rear ends of the left and right front side frames 4 are joined to an unillustrated dashboard lower cross-member extending in the vehicle width direction and coupling left and right front pillars 5, and also to a front edge of an unillustrated front floor frame extending in the vehicle longitudinal direction below the cabin 3. Side surfaces of rear portions of the front side frames 4 are joined to a front end of a side sill 8 through an outrigger 7.

Upper members 9 extending substantially along the vehicle longitudinal direction and joined to the left and right front pillars 5 are disposed on both sides (on outer sides of the left and right front side frames 4 in the vehicle width direction) of an upper portion of the engine compartment 2. The upper members 9 are curved downward toward the front of the vehicle body from the left and right front pillars 5 through a joint panel 13 in such a manner that the front ends of the upper members 9 extend to locations positioned on outer sides of the front ends of the front side frames 4. In this embodiment, the joint panel 13 constitutes part of the upper members 9. The front ends of the upper members 9 are joined to the front ends of the front side frames 4 through a coupling member 10. A damper housing 14 supporting a damper of an unillustrated front suspension is joined to inner portions in the vehicle width direction of the rear edges of the left and right upper members 9. In FIG. 1, reference numeral 11 denotes a substantially U-shaped front bulkhead upper member coupling the left and right upper members 9 at a front upper end portion of the engine compartment 2. Reference numeral 12 denotes a front bulkhead lower member joined to the front bulkhead upper member 11 to form a radiator housing part. The left and right upper members 9 serve as an upper frame of the engine compartment 2. The left and right front side frames 4 serve as a lower flame of the engine compartment 2.

Figure 2:
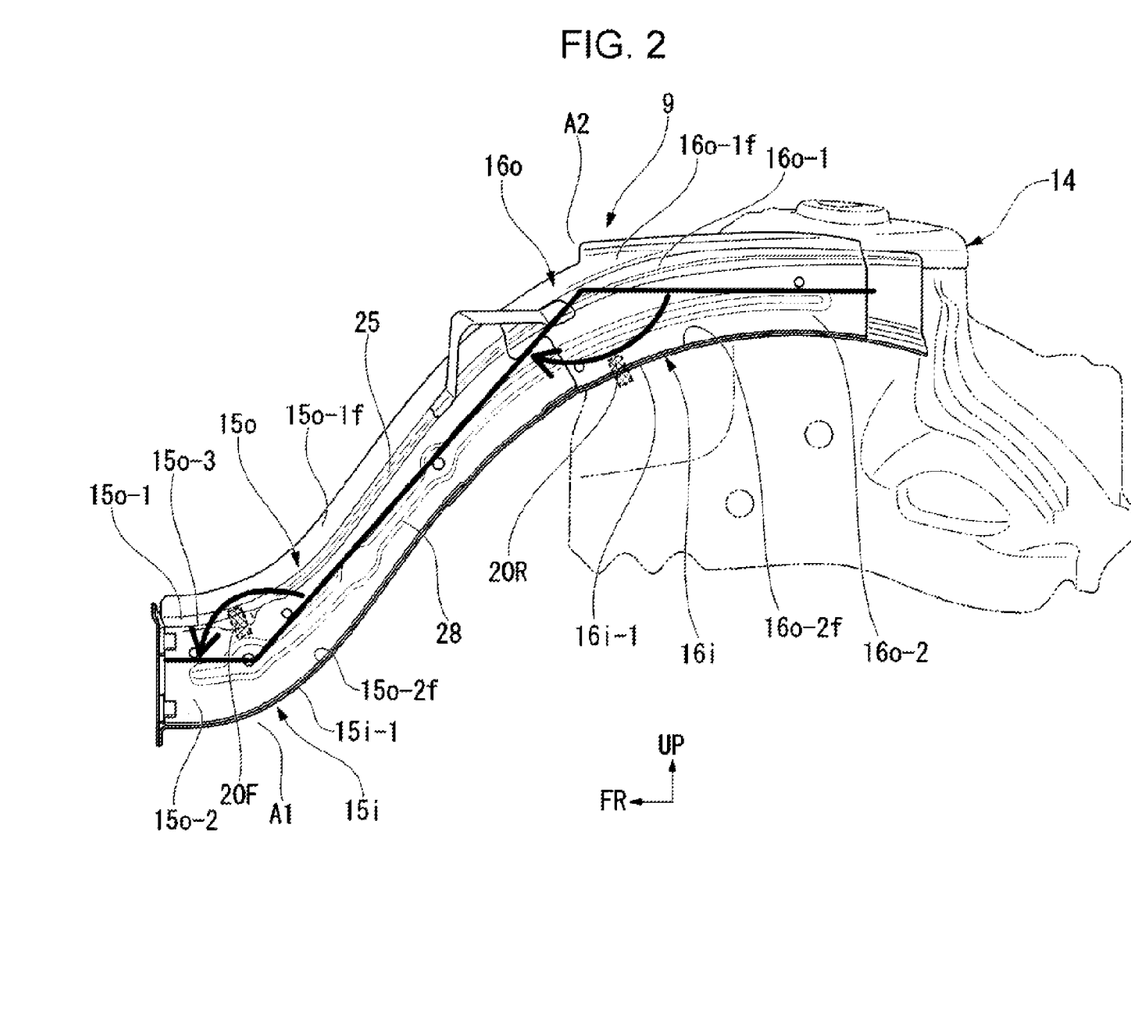
FIG. 2 is a side view illustrating an upper member according to the embodiment of the present disclosure.
Figure 3:
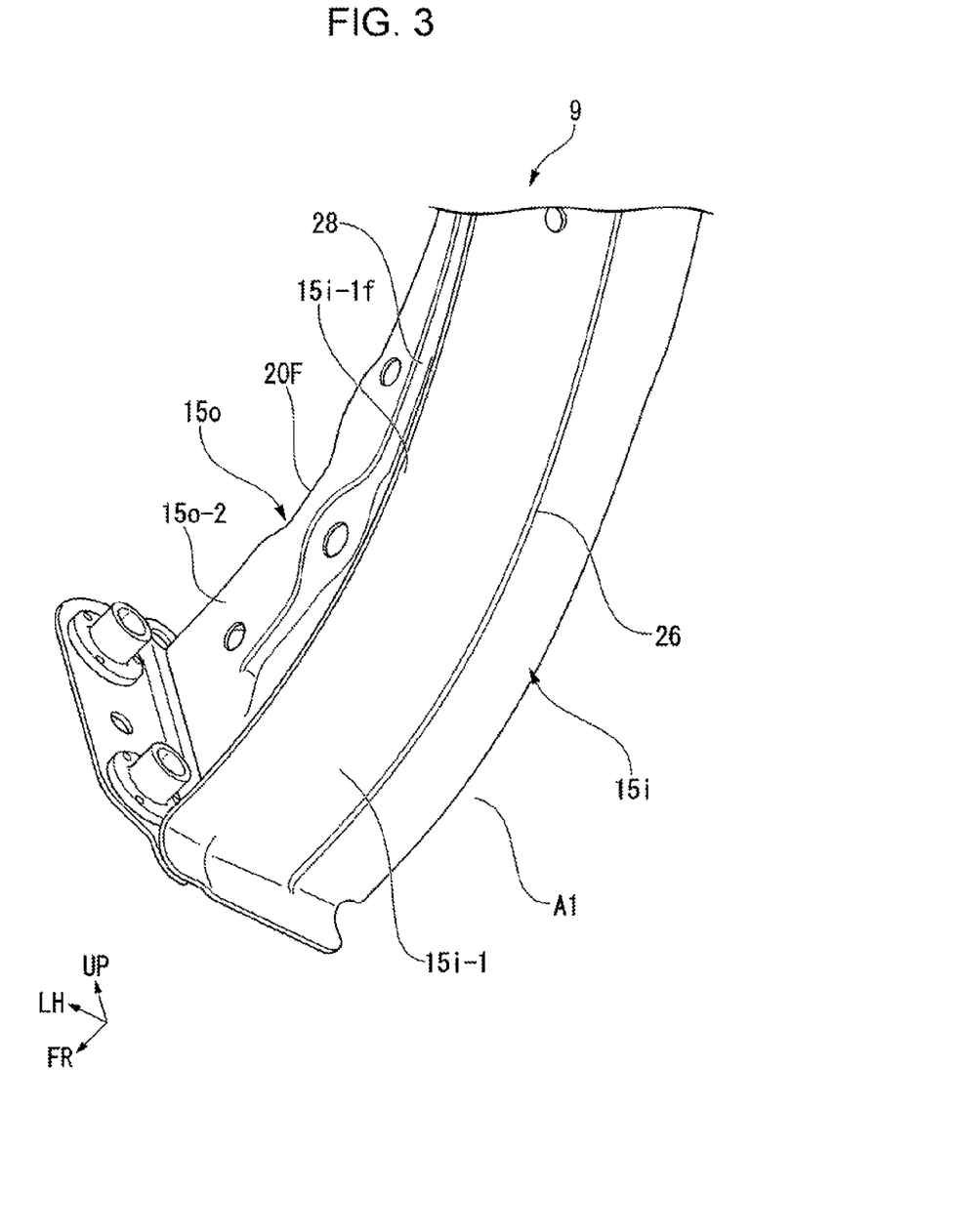
FIG. 3 is a perspective view illustrating a front region of the upper member according to the embodiment of the present disclosure.
Figure 4:
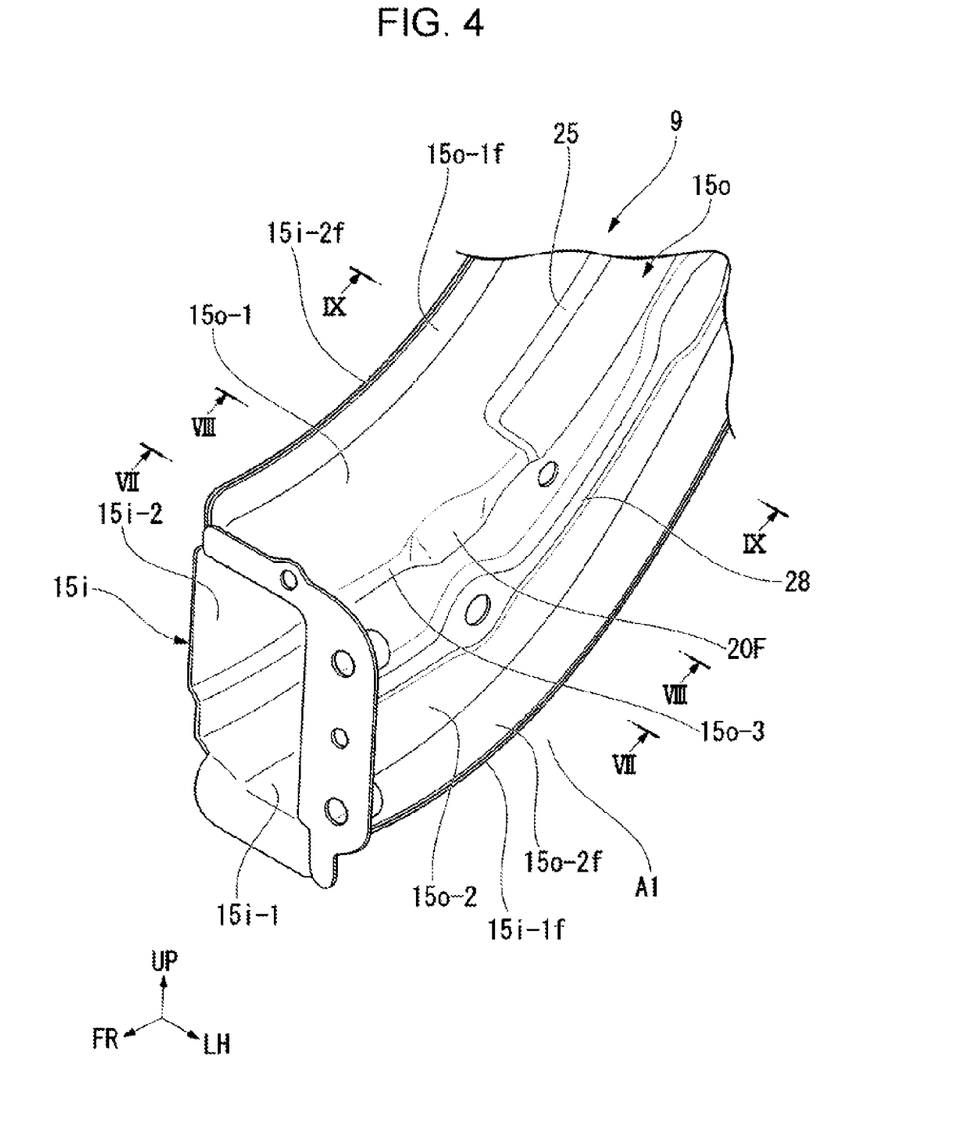
FIG. 4 is a perspective view illustrating the front region of the upper member according to the embodiment of the present disclosure.
Figure 7:
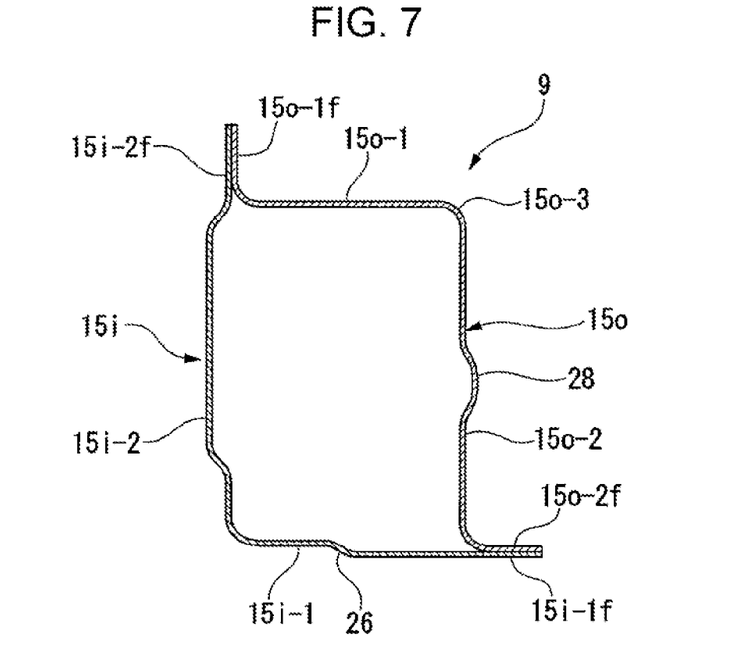
FIG. 7 is a cross-sectional view illustrating the upper member of the embodiment of the present disclosure and taken along line VII-VII in FIG. 4.
Figure 8:
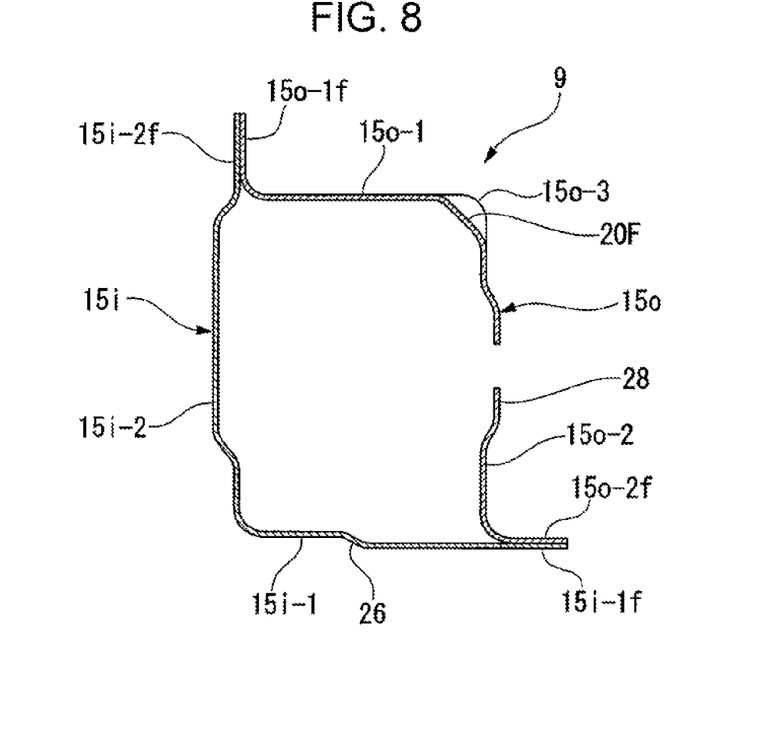
FIG. 8 is a cross-sectional view illustrating the upper member of the embodiment of the present disclosure and taken along line VIII-VIII in FIG. 4.
Figure 9:
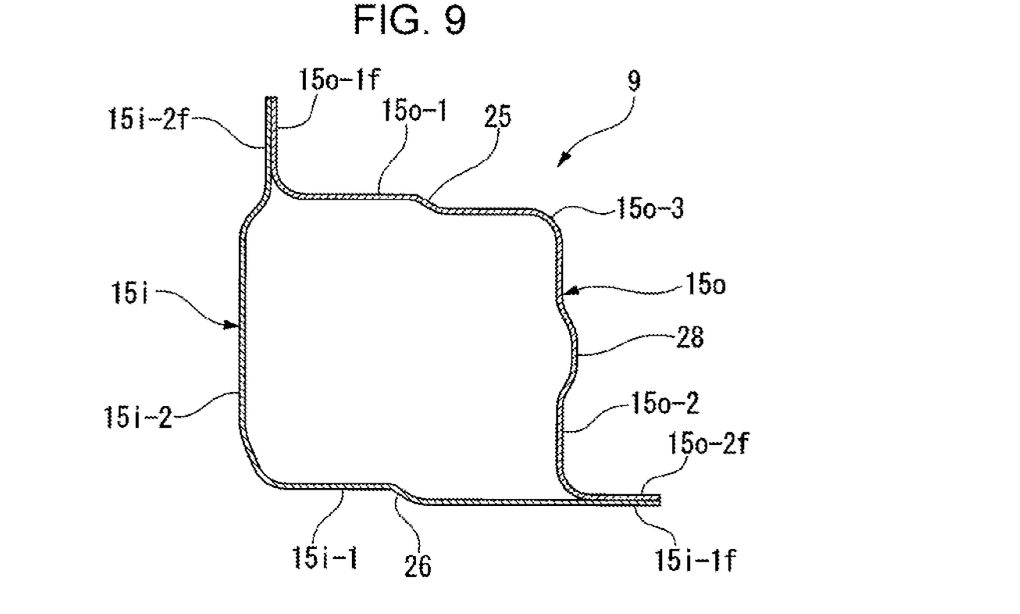
FIG. 9 is a cross-sectional view illustrating the upper member of the embodiment of the present disclosure and taken along line IX-IX in FIG. 4.

FIG. 2 is a left side view of the left upper member 9. FIG. 3 illustrates a front side portion of the left upper member 9 when viewed upward from an obliquely left rear portion. FIG. 4 illustrates the front side portion of the left upper member 9 when viewed downward from an obliquely left front portion. FIGS. 7, 8, and 9 are sectional views taken along a VII-VII line, a VIII-VIII line, and a IX-IX line in FIG. 4, respectively. The left and right upper members 9 are symmetric and have similar basic structures. The front side portion of each of the upper members 9 has a substantially rectangular cross section by joining a front inner plate 15$i$ having a substantially L shape in cross section and a front outer plate 15$o$. More specifically, the front inner plate 15$i$ includes a lower wall 15$i$-1 and an inner side wall 15$i$-2 in an inner portion of the upper member 9, and the front outer plate 15$o$ includes an upper wall 15$o$-1 and an outer side wall 15$o$-2 in the upper portion of the upper member 9. An upwardly bent flange 15$o$-1$f$ is formed at an inner end of extension in the vehicle width direction of the upper wall 15$o$-1 of the front outer plate 15$o$. The flange 15$o$-1$f$ is joined to a flange 15$i$-2$f$ at an upper end of the inner side wall 15$i$-2 of the front inner plate 15$i$. A flange 15$o$-2$f$ that is bent outward in the vehicle width direction is formed at a lower end of the outer side wall 15$o$-2 of the front outer plate 15$o$. The flange 15$o$-2$f$ is joined to a flange 15$i$-1$f$ at outer end in the vehicle width direction of the lower wall 15$i$-1 of the front inner plate 15$i$. Thus, in this embodiment, in the front side portion of the upper member 9, no flange is formed in a corner portion 15o-3 between the upper wall 15o-1 and the outer side wall 15o-2.

Figure 5:
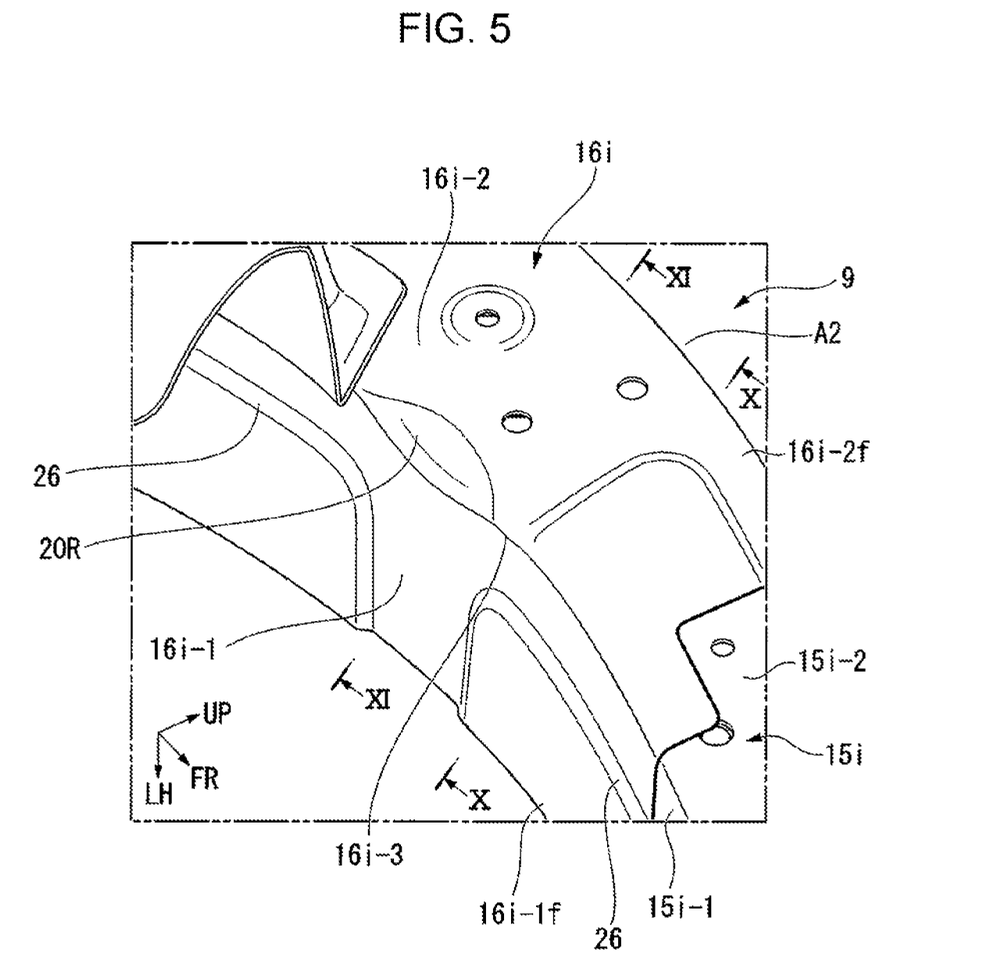
FIG. 5 is a perspective view illustrating a rear region of the upper member according to the embodiment of the present disclosure.
Figure 6:
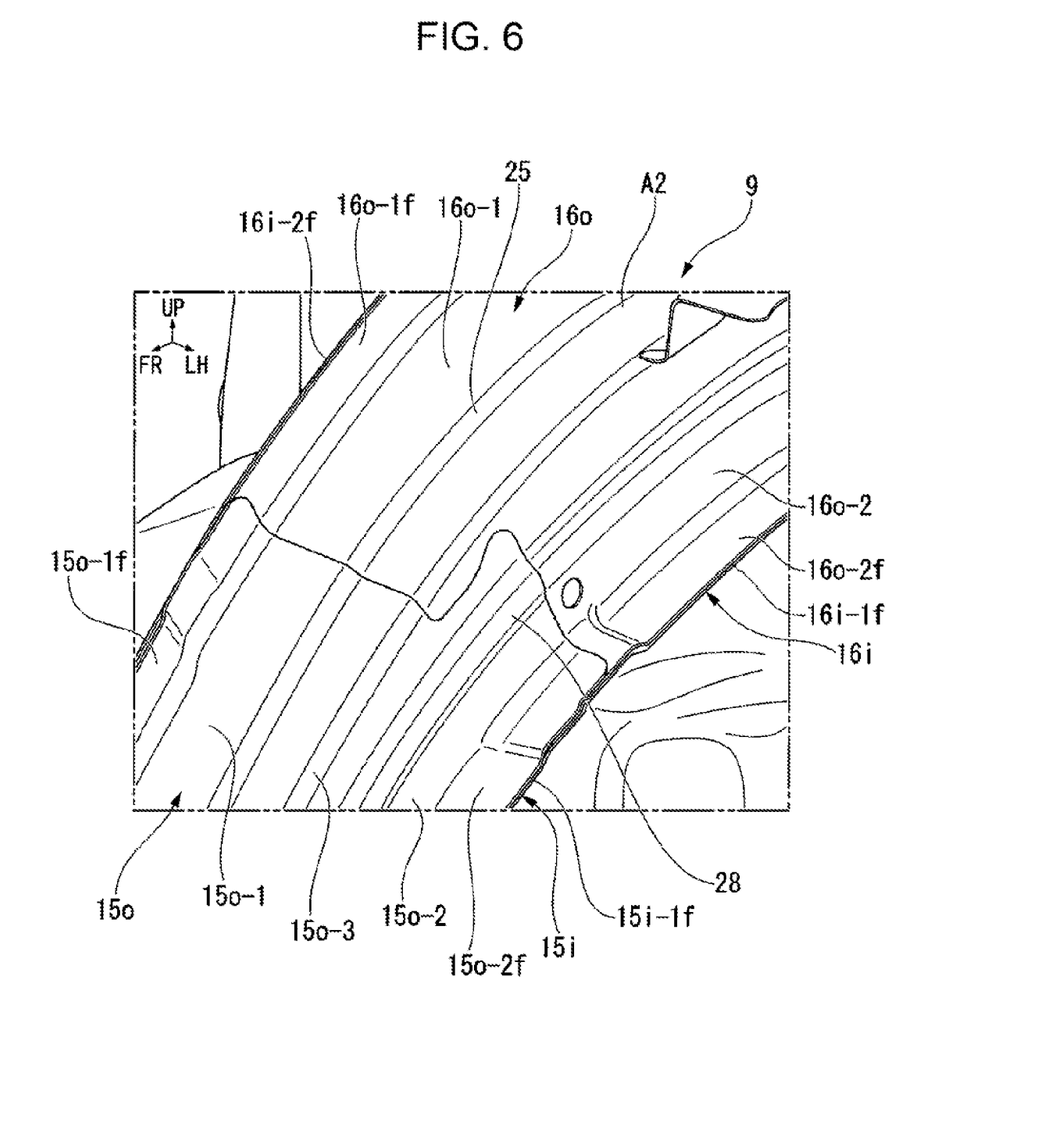
FIG. 6 is a perspective view illustrating the rear region of the upper member according to the embodiment of the present disclosure.
Figure 10:
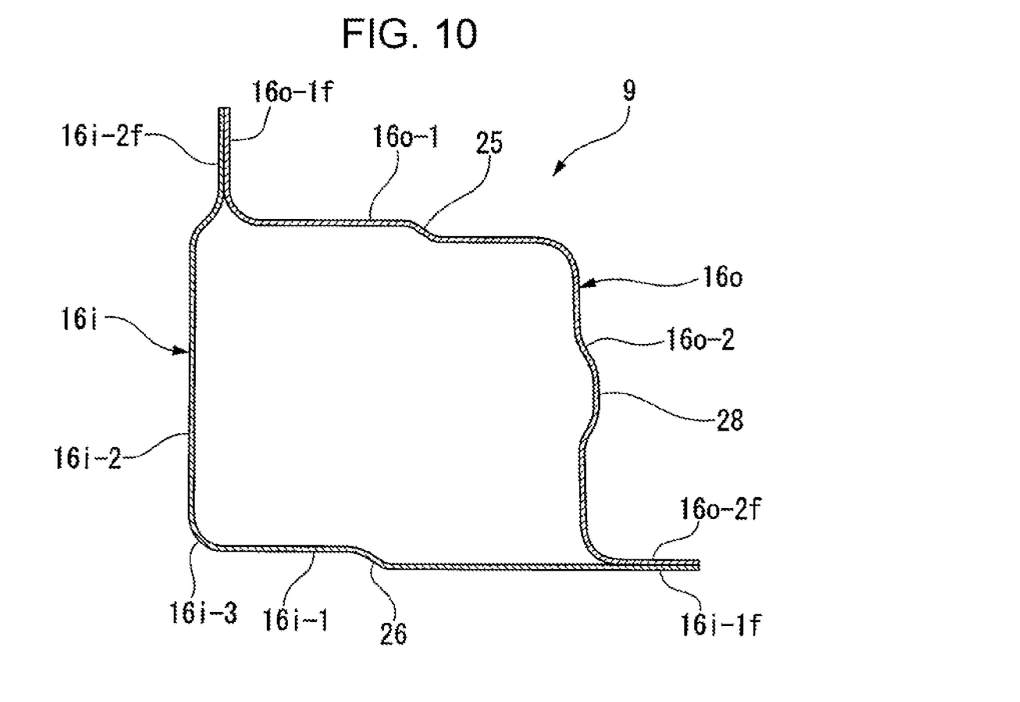
FIG. 10 is a cross-sectional view illustrating the upper member of the embodiment of the present disclosure and taken along line X-X in FIG. 5.
Figure 11:
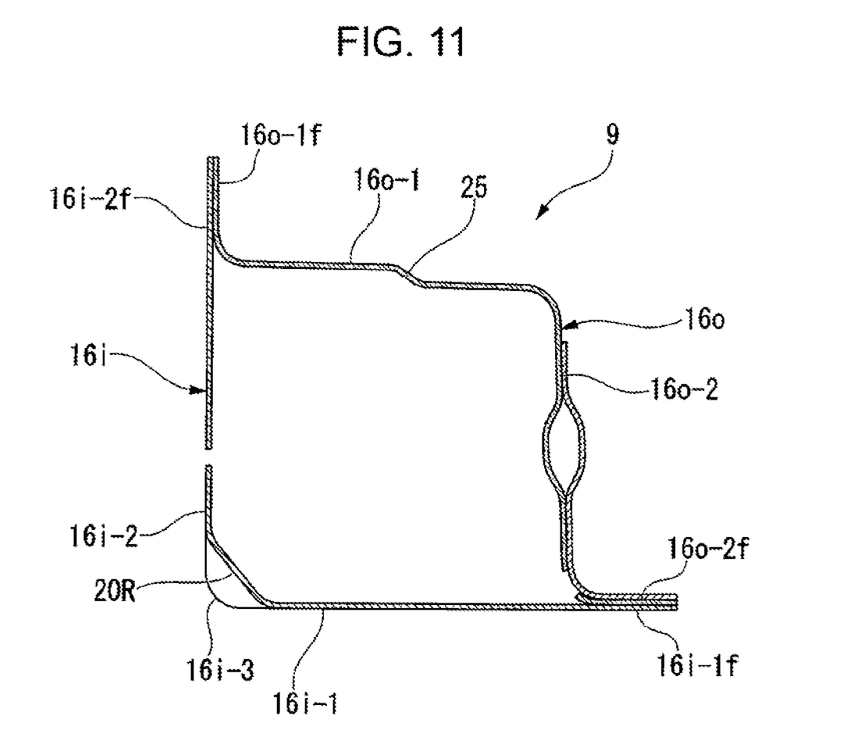
FIG. 11 is a cross-sectional view illustrating the upper member of the embodiment of the present disclosure and taken along line XI-XI in FIG. 5.

FIG. 5 illustrates a rear side portion of the left upper member 9 when viewed upward from an obliquely right front portion. FIG. 6 illustrates the rear side portion of the left upper member 9 when viewed downward from an obliquely left front portion. FIGS. 10 and 11 are sectional views taken along a X-X line and a XI-XI line, respectively, in FIG. 5. The rear side portion of the upper member 9 has a substantially rectangular cross section by joining a rear inner plate 16i having a substantially L shape in cross section and a rear outer plate 16o. The rear inner plate 16i includes a rear lower wall 16i-1 and an inner side wall 16i-2 of the upper member 9, and the rear outer plate 16o includes a rear upper wall 16o-1 and an outer side wall 16o-2 of the upper member 9. An upwardly bent flange 16o-1f is formed at an inner end of extension in the vehicle width direction of the upper wall 16o-1 of the rear outer plate 16o. The flange 16o-1f is joined to a flange 16i-2f at an upper end of the inner side wall 16i-2 of the rear inner plate 16i. A flange 16o-2f that is bent outward in the vehicle width direction is formed at a lower end of the outer side wall 16o-2 of the rear outer plate 16o. The flange 16o-2f is joined to a flange 16i-1f at outer end in the vehicle width direction of the lower wall 16i-1 of the rear inner plate 16i. Thus, in this embodiment, in the rear side portion of the upper member 9, no flange is formed in a corner portion 16i-3 between the lower wall 16i-1 and the inner side wall 16i-2.

As illustrated in FIG. 2, in the front side portion of each of the upper members 9 of this embodiment, a front end region extends substantially horizontally forward at substantially the same height as the front side frames 4. A rear side portion of the front end region serves as a front, curved region A1 that is curved upward toward the rear of the vehicle body. An extension portion extends obliquely upward toward the rear portion of the curved region A1. As illustrated in FIG. 2, in the rear side portion of the upper member 9, a rear end region joined to the corresponding front pillar 5 extends substantially horizontally rearward at substantially the same height as an upper end of the damper housing 14. A front side portion of the rear end region serves as a rear curved region A2 that is curved downward toward the front of the vehicle body. A front end of the rear curved region A2 is joined to the extension portion of the front side portion of the upper member 9. The front side portion and the rear side portion of the upper member 9 are joined to each other in such a manner that the substantially rectangular shapes of the front side portion and the rear side portion are continuous in the longitudinal direction. The front curved region A1 of the upper member 9 is curved in such a manner that the upper wall 15o-1 has a concave upper surface in the longitudinal direction. The rear curved region A2 is curved in such a manner that the lower wall 16i-1 has a concave lower surface in the longitudinal direction.

The front curved region A1 of the upper member 9 includes a recess 20F that is a weak portion and disposed in the corner portion 15o-3 between the upper wall 15o-1 and the outer side wall 15o-2. The recess 20F is recessed inward in the rectangular cross section in the upper member 9, and is configured in such a manner that when a load is applied to the upper member 9 along the longitudinal direction, a stress is concentrated on this recess 20F. The rear curved region A2 of the upper member 9 includes a recess 20R that is a weak portion and disposed in the corner portion 16i-3 between the lower wall 16i-1 and the inner side wall 16i-2. The recess 20R is recessed inward in the rectangular cross section in the upper member 9. In this embodiment, the recesses 20F and 20R are provided as weak portions in the corner portions 15o-3 and 16i-3 without flanges. The weak portions are not limited to the recesses 20F and 20R. Alternatively, the weak portions may be openings or thin portions.

The upper walls 16o-1 and 15o-1 of the upper members 9 are provided with ridges 25 that are bent stepwise at substantially center portions thereof in the width direction and extend substantially along the longitudinal direction. One of the ridges 25 extends from a proximal end of the rear upper wall 16o-1 to a portion of the front upper-wall 15o-1 near the curved region A1. More specifically, a front end of one of the ridges 25 extends to a location before the recess 20F so as not to overlap a region of the front upper wall 15o-1 where the recess 20F is disposed.

The lower walls 16i-1 and 15i-1 of the upper members 9 are provided with ridges 26 that are bent stepwise at substantially center portions thereof in the width direction and extend substantially along the longitudinal direction. One of the ridges 26 extends from a front end of the front lower wall 15i-1 to a portion of the rear lower wall 16i-1 near the curved region A2. More specifically, a rear end of one of the ridges 26 extends to a location before a region where the recess 20F is disposed so as not to overlap a region of the rear lower wall 16i-1 where the recess 20R is disposed. In this embodiment, as illustrated in FIG. 5, the ridge 26 of the rear lower wall 16i-1 temporarily disappears in a region where the recess 20F is disposed, and is continuous to a portion at the rear of the region where the recess 20F is disposed.

Since the vehicle front body structure of this embodiment has the configuration described above, when an impact load is applied from the front of the vehicle, the load is distributed to the left and right front side frames 4 and the upper members 9 and is transmitted to a rear portion of the vehicle body. In a case where a large impact load is applied to the front ends of the upper members 9, the upper members 9 are deformed with bending from the recesses 20F and 20R (weak portions) in the corner portions 15o-3 and 16i-3 of the front and back curved regions A1 and A2 as indicated by arrows in FIG. 2 so that energy of the impact load is absorbed by the upper members 9 during the deformation with bending. Thus, in the vehicle front body structure, even when a load is concentrated on the upper members 9 in application of an impact load from the front, energy of the impact load can be absorbed by the upper members 9 disposed in front of the front pillars 5. Accordingly, deformation of the front pillars 5 can be suppressed without significant reinforcement of the front pillars 5 and their peripheral portions.

In particular, in the vehicle front body structure of this embodiment, the recesses 20F and 20R that are weak portions are provided in the corner portions that are not easily elastically deformed in a plane direction in the upper members 9 and, in particular, the recesses 20F and 20R are provided in the corner portions 15o-3 and 16i-3 that are not provided with flanges and especially easily plastically deformed among the corner portions upon application of a load. Thus, when an impact load is applied from the front of the vehicle, the upper members 9 can be more stably deformed with bending.

In the vehicle front body structure of this embodiment, the upper members 9 include the curved regions A1 and A2 that are curved upward and downward, and the recesses 20F and 20R that are weak portions are provided in the corner portions 15o-3 and 16i-3 in the curved concave inner portions of the curved regions A1 and A2. Thus, upon application of an impact load, a load is easily concentrated on the recesses 20F and 20R of the upper members 9 so that the upper members 9 can be more stably deformed with bending from the recesses 20F and 20R.

In particular, in the vehicle front body structure of this embodiment, the curved region A1 that is curved upward toward the rear is provided in the front portion of each of the upper members 9, the curved region A2 that is curved downward toward the front is provided in the rear portion of each of the upper members 9, and the recesses 20F and 20R that are weak portions are provided in the corner portion 15o-3 in an upper outer portion of the front curved region A1 and the corner portion 16i-3 in a lower inner portion of the rear curved region A2. Thus, upon application of an impact load from the front of the vehicle, the front curved region A1 and the rear curved region A2 of each of the upper members 9 are deformed in such a manner that intermediate regions thereof rotate in one direction. Accordingly, the entire member is stably deformed with bending into a Z shape in side view. In the manner described above, the foregoing structure enables the upper members 9 to stably absorb energy by deformation with bending.

In the vehicle front body structure of this embodiment, the ridges 25 and 26 are provided on the upper walls 15o-1 and 16o-1 and the lower walls 15i-1 and 16i-1 of the upper members 9 to extend substantially along the direction in which the upper members 9 extend. Thus, upon application of an impact load, the ridges 25 and 26 can suppress elastic deformation in a plane direction of the upper walls 15o-1 and 16o-1 and the lower walls 15i-1 and 16i-1 so that an increased amount of energy is absorbed at or after a start of deformation with bending of the upper members 9. In addition, since the ridges 25 and 26 are provided on the upper walls 15o-1 and 16o-1 and the lower walls 15i-1 and 16i-1 of the upper members 9, deformation location and direction of the upper members 9 can be relatively easily adjusted. That is, for example, as in this embodiment, the ridges 26 and the ridges 25 are provided to be continuous in a region located outer side of the bending direction of the curved regions A1 and A2 so that deformation location and direction of the upper members 9 can be relatively easily adjusted.

Furthermore, in the vehicle front body structure of this embodiment, since the ridges 25 and 26 extend to a location near the recesses 20F and 20R so as not to overlap regions where the recesses 20F and 20R as the weak portions are provided, upon application of an impact load from the front of the vehicle, the load can be efficiently concentrated on portions near the recesses 20F and 20R. Thus, this structure enables more stable deformation with bending of the upper members 9 in the recesses 20F and 20R.

In the vehicle front body structure of this embodiment, the stiffening beads 28 extending substantially along the direction in which the upper members 9 extend are integrally provided on the outer side walls 15o-2 and 16o-2 of the upper members 9. Thus, the stiffening beads 28 can suppress elastic deformation of the outer side walls 15o-2 and 16o-2 of the upper members 9. Accordingly, an increased amount of energy can be absorbed at or after a start of deformation with bending of the upper members 9. In addition, in the structure of this embodiment, since deformation with bending of the upper members 9 in the lateral direction can be suppressed by the stiffening beads 28, the upper members 9 can be more stably deformed with bending in the vertical direction. In this embodiment, the stiffening beads 28 are provided on the outer side walls 15o-2 and 16o-2 of the upper members 9. Alternatively, the stiffening beads 28 may be provided on the inner side walls 15i-2 and 16i-2 of the upper members 9 or may be provided on both the outer side walls 15o-2 and 16o-2 and the inner side walls 15i-2 and 16i-2.

The present application is not limited to the embodiment described above, and various design changes can be made within the scope of the present disclosure. For example, in the above embodiment, the recesses as the weak portions are provided at two locations, i.e., in the front and rear portions, of the upper members. However, the number of locations where weak portions are provided may be any number as well as two. The corner portions where the weak portions of the upper members are provided may be any corner portion as long as the corner portions do not include flanges. In the above embodiment, each of the upper members has a substantially rectangle shape in cross section by joining the inner plate and the outer plate with the flange. Alternatively, the upper member may be an integrated cylinder without a flange for joint. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle front body structure comprising:
    a pair of left and right front side frames extending substantially along a vehicle longitudinal direction and forward from a front lower portion of a cabin; and
    a pair of left and right upper members, each disposed on an outer side of corresponding one of the left and right front side frames in a vehicle width direction, extending substantially along the vehicle longitudinal direction such that a front end of the respective left and right upper members is positioned on the outer side of a front end of the corresponding one of the left and right front side frames in the vehicle width direction, and having a rear end joined to a front pillar disposed at a lateral end of the front portion of the cabin, wherein
    each of the upper members has a substantially rectangular shape in cross section constituted by left and right side walls and upper and lower walls, and
    a weak portion is provided in at least one corner portion having no flange among corner portions provided between adjacent walls of the left side wall, the right side wall, the upper wall and the lower wall.

2. The vehicle front body structure of claim 1, wherein
    each of the upper members includes at least one curved region that is curved upward or downward, and
    the weak portion is disposed in a curved corner portion in the curved region, the curved corner portion located between the upper or lower wall having a concave outer surface and one of the side walls adjacent to the upper or lower wall having the concave outer surface.

3. The vehicle front body structure of claim 2, wherein
    each of the upper members includes a front curved region that is curved upward toward a rear of the vehicle and a rear curved region that is curved downward toward a front of the vehicle,
    in the front curved region, the weak portion is disposed in a first curved corner portion between the upper wall and one of the side walls adjacent to the upper wall, and in the rear curved region, the weak portion is disposed in a second curved corner portion between the lower wall and one of the side walls adjacent to the lower wall.

4. The vehicle front body structure of claim 1, wherein at least one of the upper wall or the lower wall of each of the upper members includes a ridge extending substantially along a direction in which the upper member extends.

5. The vehicle front body structure of claim 4, wherein the ridge extends to a location near the weak portion so as not to overlap a region where the weak portion is provided.

6. The vehicle front body structure of claim 1, wherein at least one of the side walls of at least one of the upper members is provided with a stiffening bead extending substantially along a direction in which the upper member extends.

7. The vehicle front body structure of claim 3, wherein the first curved corner portion and the second curved corner portion are disposed diagonally opposite to each other in the cross section.

8. The vehicle front body structure of claim 7, wherein the first curved corner portion is located at upper outer corner in the vehicle width direction and the second curved corner portion is located at lower inner corner in the vehicle width direction.

9. The vehicle front body structure of claim 5, wherein the ridge extends from the rear end of the upper member to the front end of the upper member with a disconnection area of the ridge at the region where the weak portion is provided.

10. The vehicle front body structure of claim 1, wherein the front end of one of the upper member is connected to the front end of corresponding one of the front side frames.

11. A vehicle comprising the vehicle front body structure of claim 1.

* * * * *